J. D. BLACK.
ORCHARD HEATER.
APPLICATION FILED MAR. 29, 1917.
1,245,663.
Patented Nov. 6, 1917.
2 SHEETS—SHEET 2.
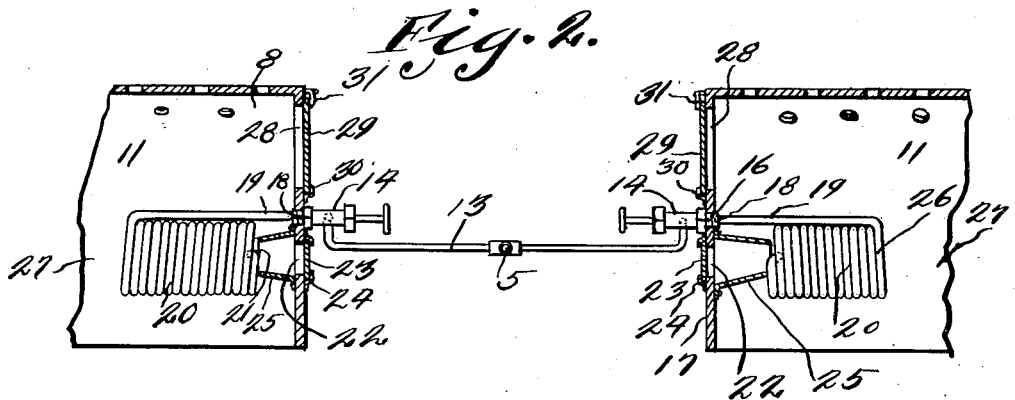
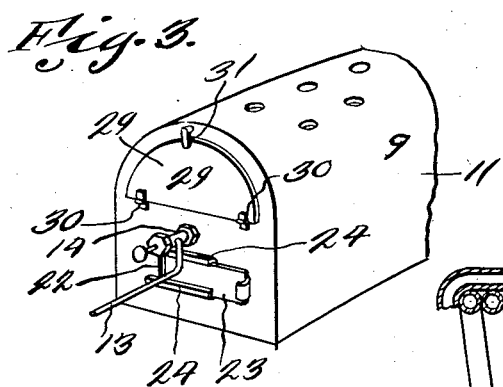
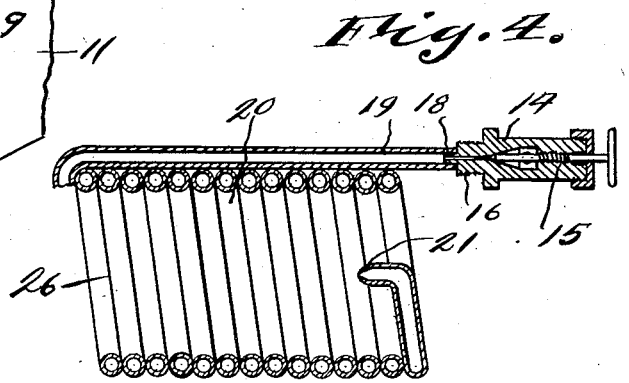
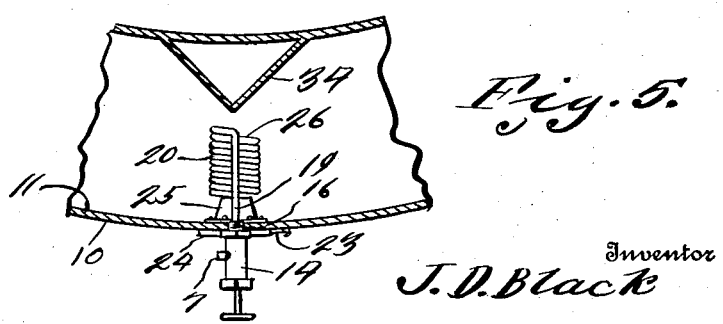
Inventor
J. D. Black
By D. Swift & Co.
Attorneys
Witnesses

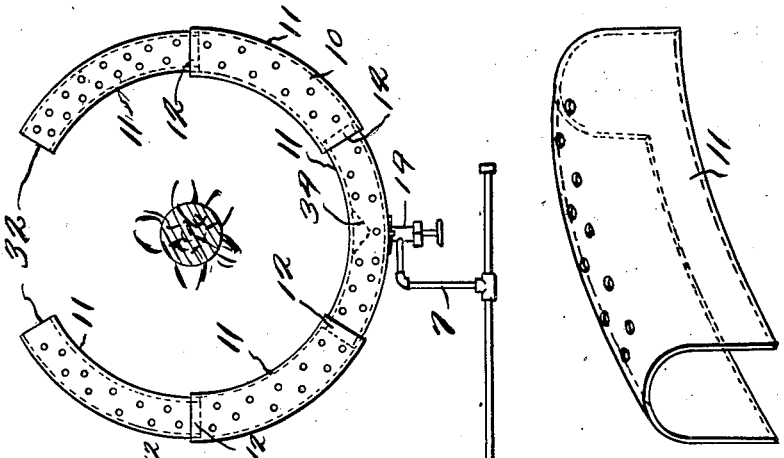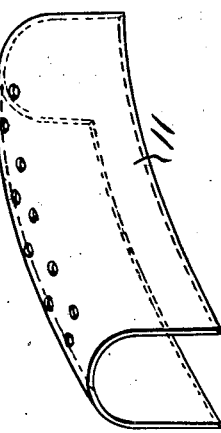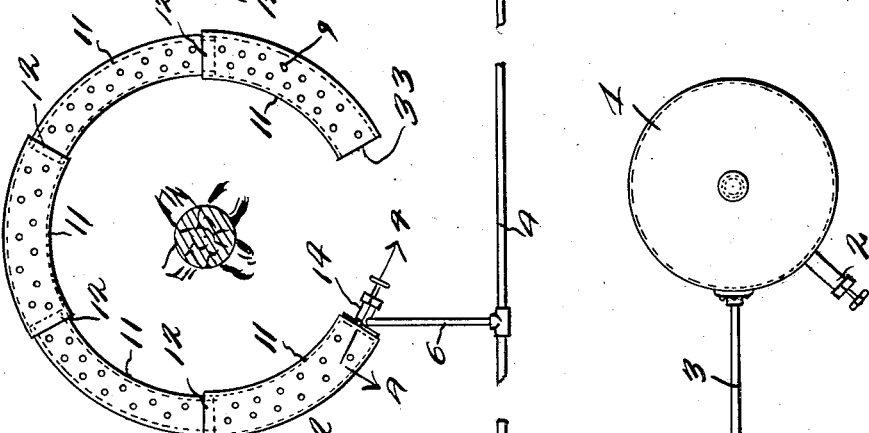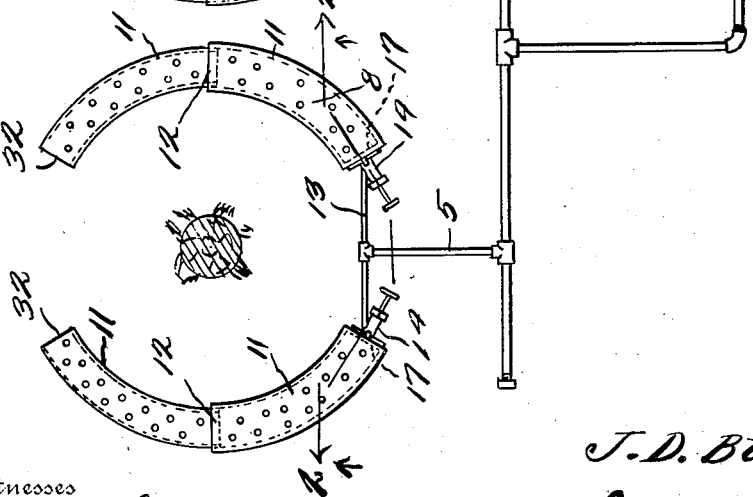

UNITED STATES PATENT OFFICE.

JOHN D. BLACK, OF REDLANDS, CALIFORNIA.

ORCHARD-HEATER.

1,245,663. Specification of Letters Patent. Patented Nov. 6, 1917.

Application filed March 29, 1917. Serial No. 158,255.

*To all whom it may concern:*

Be it known that I, JOHN D. BLACK, a citizen of the United States, residing at Redlands, in the county of San Bernardino, State of California, have invented a new and useful Orchard-Heater; and I do hereby declare the following to be a full, clear, and exact description of the invention, such as will enable others skilled in the art to which it appertains to make and use the same.

This invention relates to an improved protective and heating apparatus for various fruit trees, plants or the like, and one of the objects of the invention is to provide a simple, efficient and practical apparatus of this kind, whereby a quantity of heat may be generated about the bases of the trunks of trees and the like, in order to ascend around the branches, the leaves and the fruit for moderately heating the same, thereby protecting the same from the frost and the like.

A further object of the invention is the provision of a sectional heater to almost encompass the trunk of the tree or the like, in combination with means for injecting a suitable combustible fuel through the heater.

A further object of the invention is the provision of means for pre-heating the fuel immediately before it emanates from the injecting nozzle.

In practical fields, the details of construction may necessitate alterations falling within the scope of what is claimed.

The invention comprises further features and combination of parts, as hereinafter set forth, shown in the drawings and claimed.

In the drawings:—

Figure 1 is a plan view showing a heater applied to the trunk of a tree.

Fig. 2 is a sectional view on line 2—2 of Fig. 1.

Fig. 3 is a detail view of one end of one of the heater sections.

Fig. 4 is a sectional view on line 4—4 of Fig. 7.

Fig. 5 is a sectional view of a portion of a heater, showing the combustible fuel being injected through the side of the heater.

Fig. 6 is a detail perspective view of a heater section U-shaped in cross section.

Fig. 7 is a plan view of a heater, showing the fuel means entering one end only of the heater.

Fig. 8 is a plan view of a heater, showing the fuel injecting means connected to the heater substantially midway its ends.

Referring more especially to the drawings, 1 designates a suitable tank for containing any suitable combustible fuel, such as gasolene, benzin or the like, the same being under pressure. This fuel, when placed in the container 1, may be put under moderate pressure, or the tank or container may be provided with a suitable hand pump 2, whereby the fuel may be forced out through the pipe or conduit 3, which is in turn connected to and in communication with the main pipe or conduit 4. This pipe or conduit 4 may vary in length, and to the same, any suitable number of branch conduits 5, 6 and 7 may be connected, in order to supply or inject fuel to a series of heaters 8, 9 and 10. Each heater comprises a plurality of segmental heater sections 11 (substantially U-shaped in cross section) which are joined by means of the overlapped joints 12. Owing to the sections being U-shaped and their overlapped connections, the sections may be telescoped, whereby the heaters may be reduced in size, and whereby the sections of the heaters may be packed in a small compass for shipment or storage.

In Fig. 1, the sections of the heaters are differently arranged than the sections shown in Figs. 7 and 8. However, the three Figs. 1, 7 and 8, may be read in order to disclose a complete apparatus for heating several trees. In Fig. 1, the branch conduit 5 is connected to and in communication with a pipe or conduit 13, the opposite ends of which are connected to and in communication with needle valve casings 14 having needle valves 15 threaded therein. Each casing 14 in Fig. 1 has a reduced threaded portion 16 threaded in a closed end 17 of one of the sections. Fitting on extension 18 of the reduced part 16 is a fuel receiving tube 19, which extends into the heater section a short distance and then terminates in a return heat coil 20. The extremity of the tube of the coil terminates in a nozzle 21, which is designed to spray the fuel through the coil. The end wall 17 of the section carrying the needle valve casing has an opening 22, there being a slide 23 for closing the opening. This slide 23 is mounted in guides 24. A funnel shaped member 25 is secured on the inner face of the wall 17 adjacent the opening 22, and has its contracted end just in the rear of nozzle 21 of the coil. In practical use, the heater is arranged around the base of the trunk of the tree, reasonably close to the ground. When the fuel emanates from the nozzle, air is also drawn through the opening 22 by reason of opening the slide 23. The air mixes with the fuel, and produces a combustible charge or mixture, which may be ignited at a short distance from the terminus 26 of the coil, say for instance, at a point indicated at 27. However, the vapor from the sprayed mixture may be ignited from any suitable point throughout the heater. In some instances, the heater may rest on the ground immediately at the base of the trunk of the tree. Owing to the fuel passing through the tube 19, and through the various convolutions of the coil, the fuel becomes pre-heated before it emanates from the nozzle of the coil. The end wall 17 of the section of the heater carrying the coil and the needle valve casing has an additional opening 28, there being a door 29 hinged at 30, for closing the opening. A suitable latch 31 is employed for holding the door 29 closed. In Fig. 1, the heater is provided with two needle valve casings and two heat coils, so that the heat will pass through the sections of the heater in opposite directions, and emanate from the heater, as shown at 32. In Fig. 7, only one needle valve casing is disclosed, hence there is employed only one coil, the nozzle of which sprays the fuel through the heater in one direction, and exhausts from the other end 33 of the heater. In Fig. 8, the fuel is sprayed against a deflector 34, thereby breaking the fuel in small particles, in order to thoroughly mix with the air to be drawn through the opening 22, which, in Figs. 5 and 8, is formed in the side wall of one of the sections of the heater. Hence, it will be seen that in Fig. 8, the combustible mixture passes through the heater in opposite directions, just the same as it does in Fig. 1, with the exception that in Fig. 8 only one heat coil and needle valve casing are employed.

In use, the heater is preferably placed upon the ground, directly under the tree and to surround the trunk, or in any other suitable manner, so as to protect the tree, its leaves, foliage and fruit from contact with the flame, yet, allowing the heat to ascend, for the purpose of protecting the fruit, such as oranges, lemons or the like from frost damage. In fact, it may be used for protecting the blossoms in fruiting time. In other heaters now in use, they are so positioned relative to the trees and the like, that the outside only receives the heat, hence, it has been found that considerable heat is lost by passing directly up between the trees. In using the above type of heater, much of the oil soot lodges on or adheres to the fruit, which is very difficult to remove. Therefore, it will be seen that the appearance of the fruit is considerably damaged, and such damaged appearance of the fruit will considerably hinder the sale of the fruit. Further, the heater is designed to be arranged so that the upward movement of the heat is retarded and disseminated by the leaves throughout the trees, thereby placing the fruit in direct contact with all the warmth or heat that may be generated.

Furthermore, by placing the heater on the ground near the base of the trunk of the tree or the like, the ground receives sufficient warmth or heat, so as to keep the roots of the trees at a substantially natural temperature. Further, the warmth of the ground may be increased by increasing the amount of fuel to be consumed, hence, increasing the heat, and subsequently, the fuel may be cut off, thereby allowing the warmth from the ground to rise, and pass between the branches and the leaves of the tree.

Moreover, the soot that may accumulate on the inner surface of the sections of the heater may be easily removed by imparting sufficient blows from a suitable tool or the like on the upper wall of each section. The soot in the carbon in this case will fall upon the ground, and after which, it may be brushed away in order to not interfere with the ground absorbing the heat subsequently.

In lighting the heaters, the needle valve of each casing 14 is partly open, the damper 23 having been previously opened so that the fuel in being forced from the nozzle 21 draws in air through the opening 22, thereby vaporizing the fuel and producing a combustible mixture, which may be lighted in any suitable manner, and owing to the coil being heated, the fuel in passing through the coil is preheated, thereby volatilizing the same prior to being mixed with and volatilized or vaporized by the incoming air. It has been found more convenient to light the heaters with a suitable torch, owing to the flame of the torch being of such size as to immediately warm the oil in the coil, so that the fuel will quickly ignite, and burn until the gas is generated.

Each heater may comprise as many sections as desired, and the sections may be increased or decreased in number. Further, the sections may be any suitable size, and may be joined or connected in any convenient manner, either by welding or cementing the sections together. These sections may be constructed of any suitable material, either terra cotta, stove pipe sheeting, asbestos sheeting or composition, or cement may also be used. The adjoining ends of the sections may have shoulders to hold the sections in place. However, the sections may be made tapered, so that the larger end may fit over a smaller end of an adjoining section.

Moreover, the sections may be stacked, one arching the other and superimposed. By manipulating the needle valves, the quantity of fuel may be varied, hence varying degrees of heat may be supplied.

The invention having been set forth, what is claimed as new and useful, is:—

1. A heater for trees, comprising a plurality of segment sections telescopically united, each being U-shaped in cross section and having perforations in its upper wall, and means for injecting a combustible fuel into the heater.

2. A heater for trees, comprising a plurality of segment sections telescopically united, each being U-shaped in cross section having perforations in its upper wall, and means for injecting a combustible fuel into the heater, and means whereby air may be permitted to enter and mix with the fuel.

3. In a heater as set forth, a plurality of telescopically united sections having perforations, a fuel coil in the heater, means to permit a combustible fuel to pass through the coil from its innermost end, said coil at its other end terminating in a nozzle directed axially with the center of the convolutions of the coil, whereby the heat may pre-heat the fuel as it passes through the coil, a damper controlled opening in the heater and a funnel adjoining said opening and being concentric with the nozzle, whereby air may be drawn through the convolutions of the coil to mix with the fuel.

4. In a heater as set forth, a substantially circular casing comprising a plurality of curved segment sections, each U-shaped in cross section and having perforations in its upper wall, a damper controlled opening in the wall of the casing, a fuel coil concentric with said opening, means connected to one end of the coil, to inject fuel through the convolutions of the coil, said coil at its other end terminating in a nozzle concentric with the convolutions of the coil and said opening, whereby as the fuel leaves the nozzle air is drawn through the opening, to mix with the fuel.

5. In a heater as set forth, a substantially circular casing comprising a plurality of curved segment sections, each U-shaped in cross section and having perforations in its upper wall, a damper controlled opening in the wall of the casing, a fuel coil concentric with said opening, means connected to one end of the coil, to inject fuel through the sinuous passage of the coil, said coil at its other end terminating in a nozzle concentric with the convolutions of the coil and said opening, whereby as the fuel leaves the nozzle, air is drawn through the opening to mix with the fuel, and a deflector adjacent one end of the coil to divide and deflect the mixture in opposite directions.

In testimony whereof I have signed my name to this specification in the presence of two subscribing witnesses.

JOHN D. BLACK.

Witnesses:
  J. H. LOGIE,
  W. H. JOHNSON.